March 4, 1947.  E. F. CHANDLER  2,416,739

INTERMITTENT TRANSMISSION

Filed Oct. 16, 1943

INVENTOR.
EDWARD F. CHANDLER

BY John P. Chandler
his attorney

Patented Mar. 4, 1947

2,416,739

UNITED STATES PATENT OFFICE 2,416,739

INTERMITTENT TRANSMISSION

Edward F. Chandler, Brooklyn, N. Y.

Application October 16, 1943, Serial No. 506,617

1 Claim. (Cl. 74—118)

This invention relates to new and useful improvements in movement transmissions, and has for an object the provision of novel means for transmitting movement from a driving element to a driven element, such as driving and driven shafts, respectively, wherein the speed of the driven element is made variable without altering the speed of the driving element, the variation in speed being accomplished during movement of the several elements, and without the necessity of stopping either the driving or the driven element while the speed adjustment is being made.

The device of the present invention employs one or more intermittent driven elements, such as ratchet wheels associated with the driven shaft, and pawl driving means for each ratchet wheel associated with the driving element. Each pawl driving means has an oscillating or reciprocating movement imparted by the driving element, and in its forward or driving stroke, it engages one of the teeth of the ratchet wheel, imparting a partial rotation thereto, depending, of course, upon the length of the stroke. During the non-driving or return stroke, it idles over the teeth to pick up a new set of teeth for the next driving stroke, and if two of such pawls and ratchet wheels are used, the second pawl may impart rotation during the return stroke of the first pawl.

One of the particular improvements constituting the present invention resides in the provision of cam means for disengaging the pawl from, or preventing engagement of the pawl with, the teeth of the ratchet wheel during a portion of the driving stroke. The cam means preferably have a convexly curved cam surface, and for convenience may be mounted on the driven shaft and be free to rotate thereon. A lateral extension of the pawl may engage the cam surface during a desired portion of the driving stroke, and during the non-cam-engaging portion of the driving stroke, thus imparting intermittent movement to the ratchet wheel and driven shaft. Suitable means may be employed for rotating the cam to a desired portion to increase or reduce the angular increment imparted to the ratchet wheel on each driving stroke. These means may be manually controlled, or they may be motor driven and controlled from a remote point.

It will be apparent from the foregoing general discussion of the invention that embodiments thereof may have a variety of uses, such as a feeding mechanism used in connection with recording telegraphic systems, wherein the speed of tape drive must be frequently altered.

Another object of the present invention is the provision of an apparatus of the character described which is exceedingly small and compact, particularly as compared with existing variable speed transmission means of the friction type.

Figure 1:
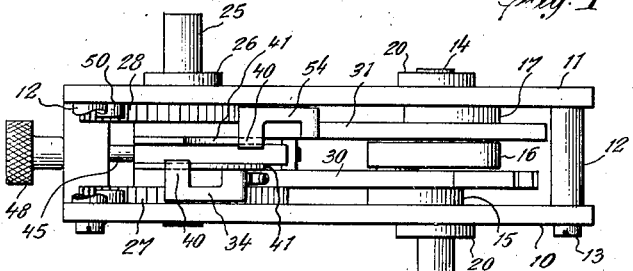
Fig. 1 is a top plan view of an embodiment of the present invention.

The embodiment of the present invention illustrated in the drawing may include a pair of spaced, generally rectangular, frame elements 10 and 11 which are maintained in this spaced relationship by means of a plurality of spacer bushings 12, the frame elements being held together by means of bolts 13, or by any other equivalent means. A crank shaft 14 constituting the driving shaft is rotated by an electric motor or any other suitable prime mover (not shown), and may be suitably carried by, or associated with, the frame. The crank shaft illustrated is of two throws, and includes crank portions 15, 16 and 17, and crank pins 18 and 19. The invention is not, however, limited to a two-throw crank shaft, since, as will be pointed out hereinafter, such crank shaft may have any desired number of throws. The crank shaft may be journalled in bearing bushings 20 mounted in frame elements 10 and 11. Any suitable bearing elements, such as ball bearings, or otherwise, may be employed for this purpose.

The driven shaft 25 is also journalled in the opposed frame members, and may be mounted in bearing bushings 26. This shaft carries a plurality of spaced ratchet wheels 27 and 28 which are keyed thereto. Also carried on this shaft, but free to rotate thereon, are a plurality of pawl levers 30 and 31 which are formed at their outer ends with slots 32 and 33, respectively, which are radially disposed relative to the axis of shaft 25, and which receive crank pins 18 and 19, respectively. It will thus be seen that rotation of driving shaft 14 produces oscillating movement in the pawl levers 30 and 31. Each pawl lever carries a pawl 34 which is pivotally mounted thereon at 35, the pawl being urged into contact with the ratchet by suitable spring means, such as a flat spring 36. It will accordingly be seen that by this arrangement, as the levers oscillate, as just described, the pawls alternately impart rotative movement to the ratchet wheels, which are, as aforesaid, keyed to the shaft, and in the arrangement shown, when the pawls drive the ratchet wheels for the full driving stroke, a substantially 45° rotation is imparted to the driven shaft for each oscillation of a pawl lever, or, in other words, one-fourth of a complete revolution of the driven shaft for each revolution of the driving shaft.

Figure 2:
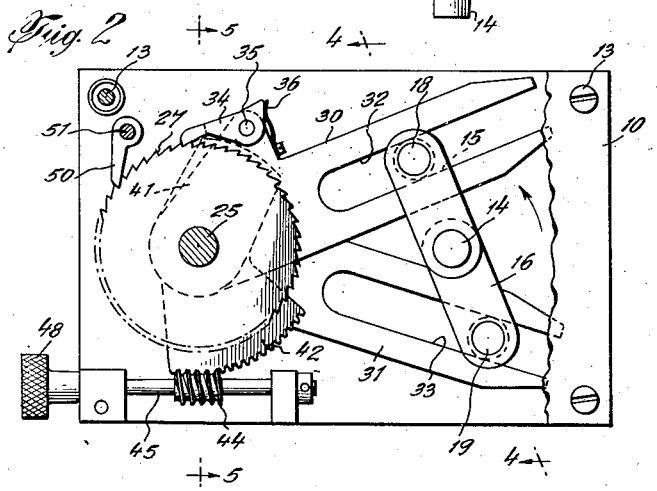
Fig. 2 is a side elevation thereof, a portion of one frame element being broken away to show certain details of operation.
Figure 4:
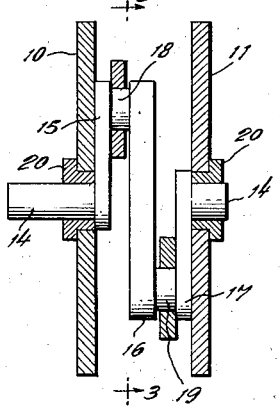
Fig. 4 is a transverse, diagonal section taken on line 4—4 of Fig. 2.

By increasing or decreasing the length of the throws of the crank shaft, rotation more or less than 45° is imparted to the driven shaft 25 for each oscillation of a pawl lever. Drive shaft 14 could be rotated in either direction, but in carrying out the purposes of the present invention, it is important that this shaft rotate in the direction indicated by the arrows in Figs. 2 and 3, for the reason that by so doing, driving action is imparted by the longest portion of the stroke, and the time lag between successive driving movements of the several pawls, while such pawls are rotated in the opposite direction over the teeth of the ratchet wheels, exists during the short portion of the stroke. This aspect is not of importance when the pawls drive the full set of teeth, since in the arrangement shown, when such is the case, drive is not intermittent but rather is constant, driven shaft 25 being driven at one-quarter the speed of driving shaft 14.

Each pawl 34 is provided with a lateral extension 40 which engages the upper surface of a cam 41 which is mounted on shaft 25 and is free to rotate thereon. There is provided one of such cams for each pawl. The cams are rotated to any desired position by means of a sector-shaped gear 42 having teeth 43, which gear is positioned between the two cams and is secured thereto. Gear 42 is rotated by means of a worm 44 mounted on a shaft 45 which is journalled at 46 and 47. The shaft may be rotated by means of a knurled head 48 on the shaft, or it may be rotated by a motor controlled from a remote point or otherwise.

Figure 3:
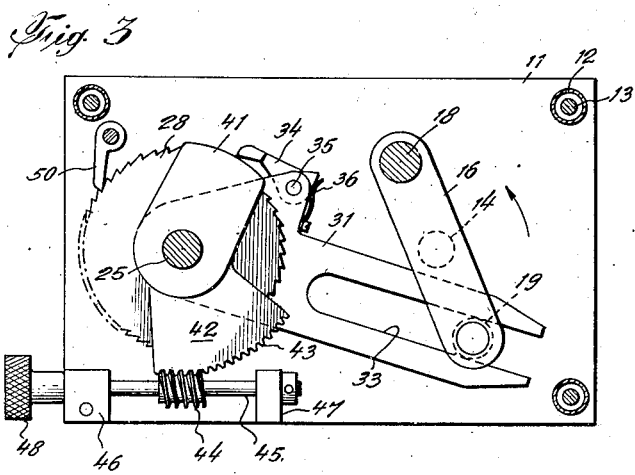
Fig. 3 is a section taken on line 3—3 of Fig. 4.
Figure 5:
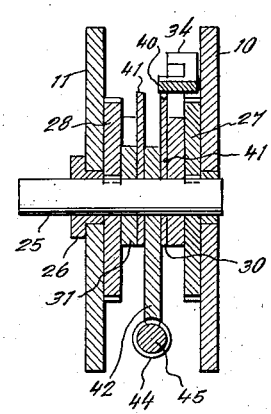
Fig. 5 is a transverse, vertical section taken on line 5—5 of Fig. 2.

In Fig. 3, the cams 41 have been rotated to substantially their maximum counter-clockwise position, in which position the lateral extensions 40 of the pawls 34 retain the pawls in elevated position for the major portion of their operating stroke, and accordingly, each oscillation of the pawl levers 30 and 31 produces rotation in the driven shaft equal to substantially the angular lead of only one tooth of the ratchet. When, however, the cams are rotated to their maximum clockwise position, no portion of such cams is engaged by the pawl extensions, and accordingly, each oscillation of the pawl lever produces the maximum drive in the driven shaft. In order to prevent opposite rotation of the driven means while the pawls ride over the teeth on the return stroke, a stop pawl 50 pivoted at 51 may engage the teeth of the ratchet wheel.

The means whereby the driving element imparts oscillating or reciprocating movement to the one or more pawl driving elements is, of course, a matter of choice, and the invention, of course, is not limited to the pawl levers 30 and 31 freely mounted on the driven shaft, since any suitable crank means may be provided, or otherwise, all as is well known in the art. In the arrangement illustrated, the variable cam elements 41 are adapted to prevent engagement of the pawls with the teeth for any desired portion of the latter part of the driving stroke of such pawls. If desired, of course, the disengagement could occur at any desired portion of the first part of the driving stroke, or an intermediate part as well.

While I have herein shown and described one form or embodiment of my invention for illustrative purposes, and have disclosed and discussed in detail the construction and arrangement incidental to a specific application thereof, it is to be understood that the invention is limited neither to the mere details or relative arrangement of parts, nor to its specific embodiment shown herein, but that extensive deviations from the illustrated form or embodiment of the invention may be made without departing from the principles thereof.

What I claim is:

A movement transmission device including, in combination, a driving element comprising a multiple-throw crankshaft, a driven shaft, a pair of spaced frame members providing journals for such shafts, a plurality of ratchet wheels carried by and keyed to the driven shaft, a plurality of pawl levers freely journalled at one end thereof on said driven shaft, such levers having slots extending inwardly from their opposite ends which receive the throws of the crankshaft, a spring-pressed pawl carried by each pawl lever which engages one ratchet wheel, a detent engaging the ratchet wheel to prevent reverse rotation thereof, a plurality of convexly-curved cam elements also freely journalled on the driven shaft for lifting the pawl from the ratchet wheel during a desired portion of the driving stroke, and means for simultaneously adjusting the angular position of the cam elements to vary the speed of transmission from the driving to the driven shafts, such means comprising a rotatable worm and a worm gear associated with the cam elements and being rotated by the worm to effect fine adjustment of the cam elements.

EDWARD F. CHANDLER.

REFERENCES CITED

The following references are of record in the file of this patent:

UNITED STATES PATENTS

| Number | Name | Date |
|---|---|---|
| 1,759,856 | Klein | May 27, 1930 |
| 549,868 | Box | Nov. 12, 1895 |
| 1,422,682 | Eklund | July 11, 1922 |
| 2,016,854 | Cramer | Oct. 8, 1935 |
| 855,039 | Baron | May 28, 1907 |
| 2,340,707 | Staley | Feb. 1, 1944 |

FOREIGN PATENTS

| Number | Country | Date |
|---|---|---|
| 14,248 | British | 1904 |
| 5,155 | British | 1914 |
| 545,612 | French | July 26, 1922 |